United States Patent
Lubischer et al.

(10) Patent No.: US 10,766,518 B2
(45) Date of Patent: Sep. 8, 2020

(54) ROTATION CONTROL SYSTEM FOR A STEERING WHEEL AND METHOD

(71) Applicant: STEERING SOLUTIONS IP HOLDING CORPORATION, Saginaw, MI (US)

(72) Inventors: Frank P. Lubischer, Commerce Township, MI (US); Richard K. Riefe, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 167 days.

(21) Appl. No.: 15/827,511

(22) Filed: Nov. 30, 2017

(65) Prior Publication Data

US 2018/0079442 A1    Mar. 22, 2018

Related U.S. Application Data

(63) Continuation of application No. 14/984,311, filed on Dec. 30, 2015, now abandoned.

(60) Provisional application No. 62/184,511, filed on Jun. 25, 2015.

(51) Int. Cl.
| | | |
|---|---|---|
| *B60Q 1/00* | (2006.01) | |
| *B62D 6/00* | (2006.01) | |
| *G05D 1/02* | (2020.01) | |
| *B62D 1/183* | (2006.01) | |

(52) U.S. Cl.
CPC .................................. *B62D 1/183* (2013.01)

(58) Field of Classification Search
None
See application file for complete search history.

(56) References Cited

U.S. PATENT DOCUMENTS

| | | | |
|---|---|---|---|
| 1,795,566 | A | 3/1931 | Maccomb |
| 1,944,905 | A | 1/1934 | Rowell |
| 2,465,825 | A | 3/1949 | Tucker |
| 2,622,690 | A | 12/1952 | Barenyi |
| 3,734,051 | A | 5/1973 | Dahl |
| 3,910,597 | A | 10/1975 | Seko |
| 4,013,034 | A | 3/1977 | Cantley et al. |
| 4,315,117 | A | 2/1982 | Kokubo et al. |
| 4,337,967 | A | 7/1982 | Yoshida et al. |
| 4,368,454 | A | 1/1983 | Pilatzki |

(Continued)

FOREIGN PATENT DOCUMENTS

| | | |
|---|---|---|
| CA | 1318833 C | 6/1993 |
| CN | 1722030 A | 1/2006 |

(Continued)

OTHER PUBLICATIONS

European Office Action for European Application No. 03075462.6 dated Jan. 4, 2010, 4 pages.

(Continued)

*Primary Examiner* — Adam D Tissot
(74) *Attorney, Agent, or Firm* — Dickinson Wright PLLC

(57) ABSTRACT

A rotation control system for a steering wheel is provided. The rotation control system includes a steering wheel and a steering shaft operatively coupled to the steering wheel. The rotation control system also includes at least one component operatively coupled to the steering shaft configured to switch the steering wheel between a rotational condition and a non-rotational condition.

14 Claims, 2 Drawing Sheets

(56) References Cited

U.S. PATENT DOCUMENTS

| | | | |
|---|---|---|---|
| 4,429,588 A | 2/1984 | Emundts et al. |
| 4,485,371 A | 11/1984 | Yamada et al. |
| 4,503,300 A | 3/1985 | Lane, Jr. |
| 4,503,504 A | 3/1985 | Suzumura et al. |
| 4,561,323 A | 12/1985 | Stromberg |
| 4,603,599 A | 8/1986 | Matsuoka |
| 4,625,578 A | 12/1986 | Nishijima |
| 4,635,029 A | 1/1987 | Yamada |
| 4,638,287 A | 1/1987 | Umebayashi |
| 4,674,352 A | 6/1987 | Mizuno et al. |
| 4,691,587 A | 9/1987 | Farrand et al. |
| 4,715,463 A | 12/1987 | Shimizu |
| 4,766,326 A | 8/1988 | Hayashi et al. |
| 4,771,650 A | 9/1988 | Kerner |
| 4,771,846 A | 9/1988 | Venable et al. |
| 4,825,972 A | 5/1989 | Shimizu |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,072,628 A | 12/1991 | Oki |
| 5,240,284 A | 8/1993 | Takada et al. |
| 5,295,712 A | 3/1994 | Omura |
| 5,319,803 A | 6/1994 | Allen |
| 5,347,458 A | 9/1994 | Serizawa et al. |
| 5,465,632 A | 11/1995 | Oki et al. |
| 5,488,555 A | 1/1996 | Asgari |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,826,677 A * | 10/1998 | Nishizaki ............ B62D 5/0835 |
| | | | 180/421 |
| 5,835,868 A * | 11/1998 | McElroy ............ B60R 25/005 |
| | | | 701/2 |
| 5,835,870 A | 11/1998 | Kagawa |
| 5,893,580 A | 4/1999 | Hoagland et al. |
| 5,911,789 A | 6/1999 | Keipert et al. |
| 6,070,686 A | 6/2000 | Pollmann |
| 6,109,651 A | 8/2000 | Frisch |
| 6,142,504 A | 11/2000 | Papandreou |
| 6,145,402 A | 11/2000 | Nishitani et al. |
| 6,170,862 B1 | 1/2001 | Hoagland et al. |
| 6,176,341 B1 | 1/2001 | Ansari |
| 6,227,571 B1 | 5/2001 | Sheng et al. |
| 6,301,534 B1 | 10/2001 | McDermott, Jr. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,394,218 B1 | 5/2002 | Heitzer |
| 6,419,043 B1 | 7/2002 | Duval et al. |
| 6,488,115 B1 | 12/2002 | Ozsoylu et al. |
| 6,548,969 B2 | 4/2003 | Ewbank et al. |
| 6,578,449 B1 | 6/2003 | Anspaugh et al. |
| 6,588,540 B2 | 7/2003 | Graber et al. |
| 6,612,393 B2 | 9/2003 | Bohner et al. |
| 6,644,432 B1 | 11/2003 | Yost et al. |
| 6,819,990 B2 | 11/2004 | Ichinose |
| 6,955,623 B2 | 10/2005 | Pattok |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,380,828 B2 | 6/2008 | Menjak et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,665,572 B2 | 2/2010 | Yamanaka et al. |
| 7,690,685 B2 | 4/2010 | Sasaoka |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,878,294 B2 | 2/2011 | Morikawa |
| 7,894,951 B2 | 2/2011 | Norris et al. |
| 7,909,361 B2 | 3/2011 | Oblizajek et al. |
| 7,931,296 B2 | 4/2011 | Choi |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,170,725 B2 | 5/2012 | Chin et al. |
| 8,220,355 B2 | 7/2012 | Rouleau et al. |
| 8,260,482 B1 | 9/2012 | Szybalski et al. |
| 8,352,110 B1 | 1/2013 | Szybalski et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,666,607 B2 * | 3/2014 | Kojo ............ B62D 5/003 |
| | | | 180/443 |
| 8,670,891 B1 | 3/2014 | Szybalski et al. |
| 8,695,750 B1 | 4/2014 | Hammond et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,114,827 B2 | 8/2015 | Burns, Jr. |
| 9,134,729 B1 | 9/2015 | Szybalski et al. |
| 9,150,200 B2 | 10/2015 | Urhahne |
| 9,150,224 B2 * | 10/2015 | Yopp ............ B60W 50/12 |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Yamaguchi |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 9,771,101 B2 * | 9/2017 | Mitsumoto ............ B62D 1/286 |
| 9,809,155 B2 * | 11/2017 | Watz ............ B60Q 1/1469 |
| 9,845,106 B2 | 12/2017 | Bodtker et al. |
| 2002/0121153 A1 | 9/2002 | Hoblingre |
| 2002/0189888 A1 | 12/2002 | Magnus et al. |
| 2003/0046012 A1 | 3/2003 | Yamaguchi |
| 2003/0094330 A1 | 5/2003 | Boloorchi et al. |
| 2003/0127276 A1 | 7/2003 | Shimizu et al. |
| 2003/0146037 A1 | 8/2003 | Menjak et al. |

(56) References Cited

U.S. PATENT DOCUMENTS

| | | |
|---|---|---|
| 2003/0164060 A1 | 9/2003 | Menjak |
| 2003/0188918 A1 | 10/2003 | Shimizu et al. |
| 2003/0192734 A1 | 10/2003 | Bugosh |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0168848 A1 | 9/2004 | Bohner et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0275205 A1 | 12/2005 | Ahnafield |
| 2006/0202462 A1 | 9/2006 | Menjak et al. |
| 2006/0224287 A1 | 10/2006 | Izawa et al. |
| 2006/0244251 A1 | 11/2006 | Muller |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito et al. |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2008/0277178 A1 | 11/2008 | Poli et al. |
| 2009/0024278 A1 | 1/2009 | Kondo et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0029200 A1 | 2/2011 | Shah |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1* | 1/2013 | Gazit .................. B62D 1/28 340/438 |
| 2013/0325202 A1 | 1/2013 | Howard et al. |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2013/0319163 A1 | 12/2013 | Davies et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0300479 A1 | 4/2014 | Wolter et al. |
| 2014/0136055 A1 | 5/2014 | Sugiyama |
| 2014/0277896 A1 | 9/2014 | Lathrop et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer et al. |
| 2015/0051780 A1 | 1/2015 | Hahne |
| 2015/0120142 A1 | 1/2015 | Park et al. |
| 2015/0210273 A1 | 2/2015 | Kaufmann et al. |
| 2015/0060185 A1 | 3/2015 | Feguri |
| 2015/0088357 A1 | 3/2015 | Yopp |
| 2015/0246673 A1 | 4/2015 | Tseng et al. |
| 2015/0251666 A1 | 7/2015 | Attard et al. |
| 2015/0283998 A1 | 9/2015 | Lind et al. |
| 2015/0324111 A1 | 9/2015 | Jubner et al. |
| 2016/0009311 A1 | 1/2016 | Khale et al. |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0200246 A1 | 3/2016 | Lisseman et al. |
| 2016/0185387 A1 | 6/2016 | Kuoch |
| 2016/0200343 A1 | 6/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0304123 A1 | 10/2016 | Lewis et al. |
| 2016/0318540 A1 | 11/2016 | King |
| 2016/0318542 A1 | 11/2016 | Pattok et al. |
| 2016/0347347 A1 | 12/2016 | Lubischer et al. |
| 2016/0347348 A1 | 12/2016 | Lubischer et al. |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer et al. |
| 2017/0029009 A1 | 2/2017 | Rouleau |
| 2017/0029018 A1 | 2/2017 | Lubischer et al. |
| 2017/0057541 A1 | 3/2017 | Bodtker et al. |
| 2017/0106894 A1 | 4/2017 | Bodtker |
| 2017/0113712 A1 | 4/2017 | Watz |
| 2018/0072339 A1 | 3/2018 | Bodtker |

FOREIGN PATENT DOCUMENTS

| | | |
|---|---|---|
| CN | 1736786 A | 2/2006 |
| CN | 101037117 A | 9/2007 |
| CN | 101041355 A | 9/2007 |
| CN | 101108629 A | 1/2008 |
| CN | 101213124 A | 7/2008 |
| CN | 101341345 A | 1/2009 |
| CN | 101596903 A | 12/2009 |
| CN | 101674965 A | 3/2010 |
| CN | 101758855 A | 6/2010 |
| CN | 102452391 A | 5/2012 |
| CN | 103359151 A | 10/2013 |
| CN | 103419840 A2 | 12/2013 |
| CN | 103448785 A | 12/2013 |
| CN | 203460923 U | 3/2014 |
| CN | 104044629 A | 9/2014 |
| CN | 104079669 A | * 10/2014 |
| CN | 104079669 A | 10/2014 |
| CN | 104512458 A | 4/2015 |
| CN | 104602989 A | 5/2015 |
| DE | 19625503 C1 | 9/1997 |
| DE | 19923012 A1 | 11/2000 |
| DE | 10020085 C1 | 7/2001 |
| DE | 10036281 A1 | 7/2002 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102010025197 A1 | 12/2011 |
| EP | 0339612 A2 | 11/1989 |
| EP | 0857638 A2 | 8/1998 |
| EP | 0931711 A1 | 7/1999 |
| EP | 1559630 A2 | 8/2005 |
| EP | 1783719 A2 | 5/2007 |
| EP | 1932745 A2 | 6/2008 |
| EP | 1990244 A1 | 11/2008 |
| EP | 2384946 A2 | 11/2011 |
| EP | 2426030 A1 | 3/2012 |
| EP | 2489577 A2 | 8/2012 |

(56) References Cited

FOREIGN PATENT DOCUMENTS

| EP | 2604487 A1 | 6/2013 |
|---|---|---|
| EP | 1606149 B1 | 5/2014 |
| FR | 2862595 A1 | 5/2005 |
| FR | 3016327 A1 | 7/2015 |
| JP | S60157963 A | 8/1985 |
| JP | S6343846 A | 2/1988 |
| JP | H05162652 A | 6/1993 |
| JP | 2000355278 A | 12/2000 |
| JP | 2004009989 A | 1/2004 |
| JP | 2007253809 A | 10/2007 |
| KR | 20100063433 A | 6/2010 |
| WO | 2006099483 A1 | 9/2006 |
| WO | 2010082394 A1 | 7/2010 |
| WO | 2015049231 A1 | 4/2015 |

OTHER PUBLICATIONS

Chinese Office Action & Search Report for Chinese Application No. 2016103666609.X dated Dec. 20, 2017, including English Translation, 16 pgs.

Chinese Office Action & Search Report for Chinese Application No. 201610609675.5 dated Feb. 27, 2018, including English translation, 19 pgs.

Chinese Office Action & Search Report for Chinese Application No. 201610774207.3 dated Apr. 4, 2018, including English Translation, 14 pgs.

English Translation of Chinese Office Action & Search Report for Chinese Application No. 20161062032.9 dated Jan. 19, 2018, 12 pgs.

English Translation of Chinese Office Action and Search Report for Chinese Application No. 201611113748.8 dated May 30, 2018, 12 pages.

Gillespie, Thomas D.; "Fundamentals of Vehicle Dynamics"; Society of Automotive Enginers, Inc.; published 1992; 294 pages.

Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.

Van der Jagt, Pim; "Prediction of Steering Efforts During Stationary or Slow Rolling Parking Maneuvers"; Ford Forschungszentrum Aachen GmbH.; Oct. 27, 1999; 20 pages.

Varunjikar, Tejas; Design of Horizontal Curves With DownGrades Using Low-Order Vehicle Dynamics Models; A Theisis by T. Varunkikar; 2011; 141 pages.

Office Action regarding related CN App. No. 201610830186,2; dated May 7, 2019.

* cited by examiner

ROTATION CONTROL SYSTEM FOR A STEERING WHEEL AND METHOD

CROSS-REFERENCE TO RELATED APPLICATIONS

This application is a continuation of U.S. patent application Ser. No. 14/984,311, filed Dec. 30, 2015, which claims priority to U.S. Provisional Patent Application Ser. No. 62/184,511, filed Jun. 25, 2015, both of which are incorporated herein by reference in their entirety.

BACKGROUND OF THE INVENTION

The embodiments described herein relate to steering wheel assemblies and, more particularly, to a rotation control system for a steering wheel.

As autonomously driven vehicles are developed, a number of opportunities will evolve related to entertainment and functionality for drivers. Steering wheels are commonly limited to standard driving positions due to the need for a driver to handle the steering wheel during operation of the vehicle. These limitations may be unnecessary during an autonomous driving mode of a vehicle.

SUMMARY OF THE INVENTION

According to one aspect of the disclosure, a rotation control system for a steering wheel is provided. The rotation control system includes a steering wheel and a steering shaft operatively coupled to the steering wheel. The rotation control system also includes at least one component operatively coupled to the steering shaft configured to switch the steering wheel between a rotational condition and a non-rotational condition.

According to another aspect of the disclosure, an autonomous vehicle driving system is provided and includes a controller for providing a plurality of autonomous driving functions with a plurality of controller subsystems, wherein one of the controller subsystems comprises a steering wheel rotation control system. The rotation control system includes a steering wheel and a steering shaft operatively coupled to the steering wheel. The rotation control system also includes at least one component operatively coupled to the steering shaft configured to switch the steering wheel between a rotational condition and a non-rotational condition.

According to yet another aspect of the disclosure, a method of controlling a rotational condition of a vehicle steering wheel is provided. The method includes initiating steering control of a vehicle with an autonomous driving system. The method also includes switching the vehicle steering wheel from a rotational condition to a non-rotational condition.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
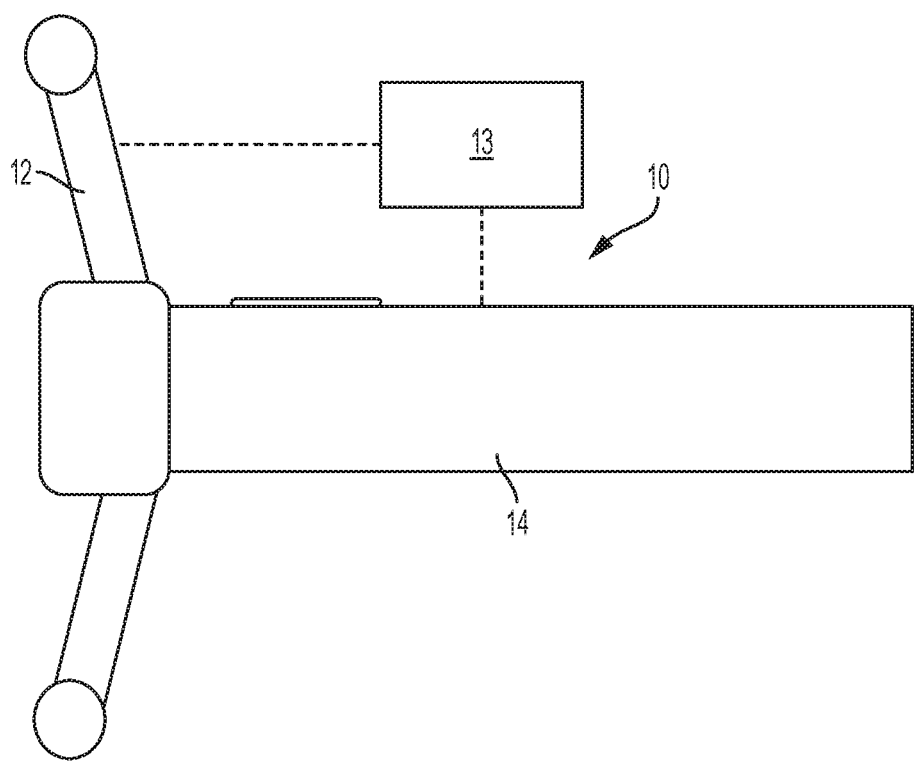
FIG. 1 schematically illustrates a steering wheel having a rotation control system.

Referring now to the Figures, where the invention will be described with reference to specific embodiments, without limiting same, a rotation control system 10 for a steering wheel 12 is provided. The rotation control system 10 facilitates switching between a rotatable condition of the steering wheel 12 and a non-rotatable condition of the steering wheel 12. Such control is advantageous in a vehicle that is capable of operating in an autonomous driving mode. Autonomous driving refers to vehicles that are configured to perform operations without continuous input from a driver (e.g., steering, accelerating, braking etc.) and may be equipped with Advanced Driver Assist System(s) (ADAS) to allow the vehicle to be autonomously controlled using sensing, steering, and/or braking technology. The ADAS includes at least one controller 13 that is in operative communication with a plurality of components, including the steering wheel 12 and the steering shaft described below. When the ADAS system is activated, the steering wheel is not required for vehicle control and, therefore, rotation of the steering wheel is not required during the autonomous driving mode. Fixing the steering wheel 12 in a non-rotational condition provides opportunities for a driver to use the steering wheel 12 as a workspace or armrest, for example. Furthermore, non-rotation of the steering wheel 12 may be desirable in a self-steering mode due to the potential for a rotating wheel to be an inducement for the driver to take hold of the steering wheel 12 inadvertently or unnecessarily, thus possibly leading to unwanted disengagement of the self-driving mode.

The embodiments described herein provide a steering shaft 14 that is operatively coupled to the steering wheel 12 and includes components of the rotation control system 10 to allow the steering wheel to be switched to a non-rotational condition that prevents rotation of the steering wheel 12, even while other steering components, such as all or portions of the steering shaft 14, are rotating during the autonomous driving mode. The steering wheel 12 is a single steering wheel that rotates, or remains stationary, at a uniform rate. In other words, no parts of the steering wheel rotate at different rates. The hub of the steering wheel and the rim of the steering wheel rotate together and no part of the steering wheel detaches from another part of the steering wheel.

The steering shaft 14 is equipped with at least one mechanism that facilitates switching between the rotational condition and non-rotational condition of the steering wheel 12. The mechanism(s) may be mechanical, electrical, or a combination thereof. In one embodiment, the rotation control system 10 physically decouples the steering shaft 14 from a steering gear and road wheels. The decoupling may occur at any portion along the length of the steering shaft 14, including an end proximate the steering wheel 12 or an end proximate the steering gear, or any location therebetween. In another embodiment, the system 10 deactivates steering wheel rotation in a "steer-by-wire" vehicle. For example, electrical deactivation of a component that provides rotational feedback to the steering wheel 12 is made to halt rotation of the steering wheel 12. In another embodiment, the system 10 counter-rotates the steering shaft 14. It is to be understood that the non-rotational condition may be achieved by alternative suitable methods.

Irrespective of the precise control employed to cause non-rotation of the steering wheel 12 during the autonomous driving mode, the driver may deactivate the autonomous driving mode by a prompt (e.g., "handshake"), such as a driver applied rotation or torque of the steering wheel 12. Alternative prompts may be used with a switch, button, handle, voice prompt, etc. Regardless of the prompt, the autonomous driving mode is ceased and driver control of steering is resumed subsequent to the prompt.

While the steering wheel 12 is in the non-rotational condition, the steering wheel 12 may be employed as a functional or entertainment related structure. For example, the steering wheel 12 may be tilted to a substantially horizontal position, or any other angle, while the vehicle is in an autonomous driving mode. This enables for non-steering uses of the steering wheel 12. In one embodiment, non-rotation allows the steering wheel 12 to be used as a tray table to rest arms or objects on. For example, a cell phone or laptop may be placed thereon for use during the autonomous driving mode. In another embodiment, forward retraction of the steering wheel 12 and steering shaft 14 toward the instrument panel of the vehicle enlarges the cabin space for additional driver comfort and convenience. In yet another embodiment, the non-rotating steering wheel provides a platform for electronic devices monitoring the cabin, driver, and vehicle controls due to the stationary orientation of the steering wheel.

Figure 2:
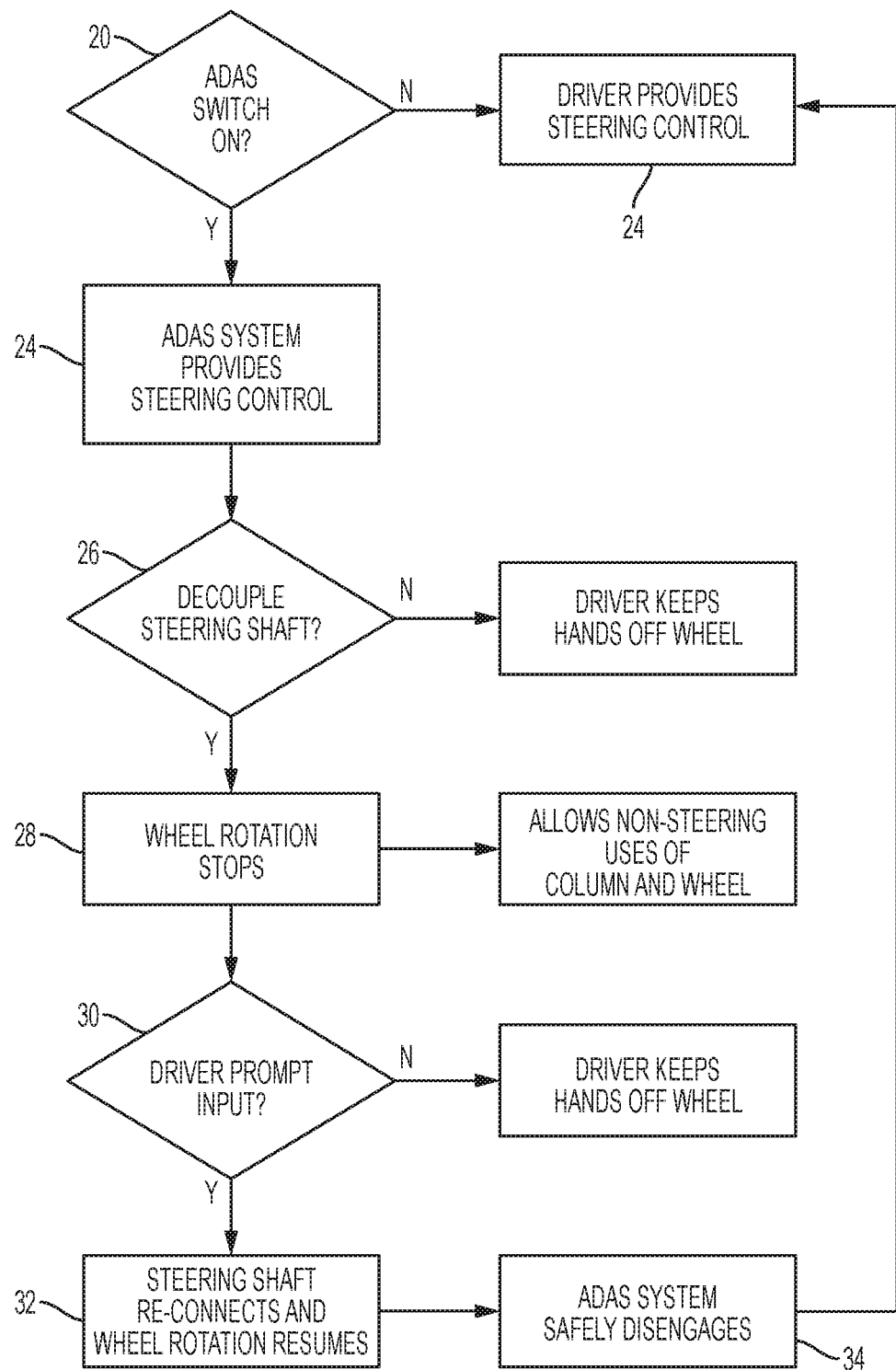
FIG. 2 is a flow diagram illustrating a method of operation of the rotation control system.

Referring to FIG. 2, a method of controlling rotation of the steering wheel is illustrated in the form of a flow diagram. The method includes determining 20 if the ADAS is activated. If it is not activated, the driver provides steering control of the vehicle 22. If activated, the ADAS system provides steering control 24. In an activated state, it is determined 26 if the steering shaft is decoupled from the steering shaft gear or otherwise prevents rotation of the steering wheel. If the steering shaft is decoupled, the steering wheel enters the non-rotational condition 28 and the steering wheel may be employed for non-steering uses. When the driver desires to regain steering control of the vehicle, the driver prompts the ADAS, such as with gripping of the steering wheel 30. Once the proper prompt is provided, the steering wheel 12 is permitted to be rotated by any, of the processes described above in connection with decoupling or deactivation of the steering wheel 12. For example, mechanical coupling may be made to re-connect 32 the necessary components of the steering shaft 14 with the steering wheel 12. Alternatively, electrical activation may be employed in a "steer-by-wire" embodiment to allow the steering wheel 12 to resume rotation. Additional suitable re-connection or activation methods may be employed. Once steering wheel 12 rotation is permitted and the user is well-suited to control steering of the vehicle, the ADAS system disengages 34.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rotation control system for a steering system comprising:
    a steering wheel having a single steering wheel;
    a steering shaft operatively coupled to the single steering wheel;
    at least one component operatively coupled to the steering shaft, the steering wheel switchable between a rotational condition and a non-rotational condition during operation of the vehicle, the rotational condition occurring during a manual driving mode and the non-rotational condition occurring during an autonomous driving mode; and
    a condition switching device for allowing a user to switch between the rotational condition and the non-rotational condition, the condition switching device comprising at least one of a switch, a button, and a voice prompt.

2. The rotation control system of claim 1, wherein the entire single steering wheel remains stationary in the non-rotational condition.

3. The rotation control system of claim 1, wherein the at least one component decouples the steering shaft from a steering shaft gear operatively coupled to road wheels of a vehicle.

4. The rotation control system of claim 1, wherein the at least one component decouples the steering shaft from the steering wheel.

5. The rotation control system of claim 1, wherein the at least one component comprises a mechanical device.

6. The rotation control system of claim 1, wherein the at least one component comprises an electrical device.

7. The rotation control system of claim 6, wherein the electrical device de-activates a component operatively coupled to the steering wheel.

8. An autonomous vehicle driving system comprising:
    a controller for providing a plurality of autonomous driving functions with a plurality of controller subsystems, wherein one of the controller subsystems comprises a steering wheel rotation control system, the rotation control system comprising:
        a steering wheel consisting of a single steering wheel;
        a steering shaft operatively coupled to the steering wheel;
        at least one component operatively coupled to the steering shaft, the steering wheel switchable between a rotational condition and a non-rotational condition during operation of the vehicle, the rotational condition occurring during a manual driving mode and the non-rotational condition occurring during an autonomous driving mode; and
        a condition switching device for allowing a user to switch between the rotational condition and the non-rotational condition, the condition switching device comprising at least one of a switch, a button, and a voice prompt.

9. The rotation control system of claim 8, wherein the entire single steering wheel remains stationary in the non-rotational condition.

10. The autonomous vehicle driving system of claim 8, wherein the at least one component decouples the steering shaft from a steering shaft gear operatively coupled to road wheels of a vehicle.

11. The autonomous vehicle driving system of claim 8, wherein the at least one component decouples the steering shaft from the steering wheel.

12. The autonomous vehicle driving system of claim 8, wherein the at least one component comprises a mechanical device.

13. The autonomous vehicle driving system of claim 8, wherein the at least one component comprises an electrical device.

14. The autonomous vehicle driving system of claim 13, wherein the electrical device de-activates a component operatively coupled to the steering wheel.

* * * * *